United States Patent
Hronek

(10) Patent No.: US 6,564,055 B1
(45) Date of Patent: May 13, 2003

(54) INTELLIGENT ROAMING DATABASE (IRDB) UPDATING

(75) Inventor: Daniel J. Hronek, Annapolis, MD (US)

(73) Assignee: TeleCommunication Systems, Inc., Annapolis, MD (US)

( * ) Notice: Subject to any disclaimer, the term of this patent is extended or adjusted under 35 U.S.C. 154(b) by 9 days.

(21) Appl. No.: 09/664,722

(22) Filed: Sep. 19, 2000

Related U.S. Application Data

(60) Provisional application No. 60/177,214, filed on Jan. 21, 2000.

(51) Int. Cl.$^7$ .................................................. H04Q 7/20
(52) U.S. Cl. ........................ 455/433; 455/418; 455/432; 455/438
(58) Field of Search ................................ 455/403, 432, 455/433, 434, 439, 440, 418, 419, 550, 552, 422

(56) References Cited

U.S. PATENT DOCUMENTS 5,740,534 A * 4/1998 Ayerst et al. ................ 455/434
5,761,618 A * 6/1998 Lynch et al. ................. 455/419
5,920,821 A * 7/1999 Seazholtz et al. ............ 455/466

(List continued on next page.)

Primary Examiner—William Trost
Assistant Examiner—Congvan Tran
(74) Attorney, Agent, or Firm—William H Bollman

(57) ABSTRACT

A unique method and apparatus to dynamically maintain different Intelligent Roaming Database (IRDB) or Preferred Roaming Lists (PRL) in a mobile handset. In accordance with the principles of the present invention, the current location of the mobile device or other individualized aspect of the mobile device (e.g., class of service, time of day, etc.) is used to determine and select one of a plurality of different wireless carrier code lists (i.e., IRDBs or PRLs) for download to a particular mobile device. Individual IRDBs may be developed for each mobile device, providing a customized wireless carrier code list based on a type of subscription plan, etc. or other network or subscriber based feature. The described IRDB is of the same size as the current system IRDB (i.e., 82 carriers maximum, 166 bytes maximum), although a list of wireless carriers of any length is within the scope of the present invention. A location based IRDB is downloaded to a particular mobile device when the mobile device enters the location corresponding to that particular location based IRDB. When one of the many location based IRDBs are updated, only those mobiles in the relevant geographical region need have their IRDB updated. When the mobile device roams to a new geographical region and re-registers, a triggering event is formed. The present invention brings the trigger for an IRDB update down to the level of the particular subscriber, e.g., based on the subscribers location, the subscribers plan, etc. The triggering event may be detected by any suitable function of the wireless network, e.g., by utilizing a registration notification (REGNOT) message from the mobile device. The triggering event will cause the download to that triggering mobile device only from a suitable over the air function (OTAF) application including a suitable location based IRDB manager of the location based IRDB for that new region, whether the location based IRDB for that reason has not been changed in a while or has been recently updated. The described location based IRDB manager is implemented in Over The Air Programming (OTAP) software. The location based IRDB manager uses conventional registration information (e.g., the current location information contained in a REGNOT message) in conjunction with data contained in a log file accessible to the location based IRDB manager to determine if a new and/or updated IRDB should be downloaded to the mobile device. Individualized IRDB updating reduces network loading. Moreover, using a location and subscriber based IRDB, the available IRDBs can be focused on a subscriber differentiating feature, e.g., a class of service (COS) basis and/or on the current location of the mobile device, to provide further customization and direction of the mobile device to carriers desired by the servicing wireless company.

22 Claims, 11 Drawing Sheets

U.S. PATENT DOCUMENTS

| | | | | |
|---|---|---|---|---|
| 5,950,130 A | * | 9/1999 | Coursey | 455/432 |
| 5,999,811 A | * | 12/1999 | Molne | 455/432 |
| 6,122,503 A | * | 9/2000 | Daly | 455/419 |
| 6,148,197 A | * | 11/2000 | Bridges et al. | 455/432 |
| 6,148,198 A | * | 11/2000 | Anderson et al. | 455/432 |
| 6,167,268 A | * | 12/2000 | Souissi et al. | 455/434 |
| 6,173,181 B1 | * | 1/2001 | Losh | 455/434 |
| 6,259,917 B1 | * | 7/2001 | Elzein | 455/435 |
| 6,248,197 B1 | * | 11/2001 | Bridges et al. | 455/432 |

* cited by examiner

INTELLIGENT ROAMING DATABASE (IRDB) UPDATING

This application claims the benefit of provisional application 60/177,214 filed Jan. 21, 2000.

BACKGROUND OF THE INVENTION

1. Field of the Invention

This invention relates generally to wireless mobile devices (e.g., mobile telephones such as cellular telephones, mobile data devices, etc.) More particularly, it relates to the distribution of intelligent roaming databases (IRDBs) including a list of available carriers to a roaming mobile device.

2. Background

Intelligent Roaming Databases (IRDB) and Preferred Roaming Lists (PRL) are sources of information contained in a mobile device (e.g., a cellular telephone) that tell the mobile which wireless carriers that the mobile should use for service. These IRDBs and PRLs are defined, e.g., in IS-136 TDMA cellular standards, and in IS-95 CDMA cellular standards. The "IRDB" terminology is used in the IS-136 TDMA standards, and "PRL" terminology is used in the IS-95 CDMA standards. The present description and drawings contained herein refer to both IRDBs and PRLs collectively as "IRDB" noting that these concepts apply not only to both TDMA and CDMA standards, but to mobile devices as a whole. Moreover, the principles of the present invention relate equally to GSM and future 3rd generation systems which will use carrier list update mechanisms.

Currently, the IRDB information contained in the mobile devices is transmitted by a system IRDB manager maintained by a service provider, and updates are dictated by the service provider as changes to the wireless network system dictate.

All mobile devices within the service provider network contain the same IRDB.

The service provider initiates if and when any IRDB update will occur, but when it occurs, all mobile devices in a wireless network (e.g., potentially millions of mobile devices for any one update) will receive the updated system IRDB. Thus, the trigger for updating the system IRDBs in each of the mobile devices is the occurrence of a revision to the system IRDB (e.g., a new carrier coming online somewhere in the system, a new partner arrangement with another wireless carrier in a roamed area, etc.) When an update is triggered, all mobile devices in a wireless network become queued for receipt of the common system IRDB.

Using a conventional system IRDB, whenever the system IRDB for a particular service provider is updated for almost any reason, all mobile devices serviced by that particular service provider must be sent an updated system IRDB even though the update doesn't affect every mobile device. This is particularly true if the update relates to a change in wireless carrier service in an area never entered by a particular mobile device.

Typically, a mobile device becomes available for an IRDB update when powered on and when not otherwise currently engaged in active use of a wireless carrier.

FIG. 7 shows relevant conventional system elements between a Home Location Register (HLR), a system Intelligent Roaming Database (IRDB), and a wireless network including a mobile device receiving updated copies of the system IRDB.

In particular, as shown in FIG. 7, a wireless system includes a plurality of mobile devices 830–832, an HLR 820, and a system IRDB manager 802. The system IRDB manager 802 maintains a common system IRDB 810, which is transmitted to all of the mobile devices 830–832 when updated.

FIG. 8 shows the relevant conventional system elements shown in FIG. 7 in more detail.

In particular, the common system IRDB 810 is transmitted to all mobile devices within the relevant wireless network using conventional IS-41 messaging, in particular, using an IS-41 Short Message Service Delivery Point-To-Point (SMSDPP) message. Appropriate switching transfer points (STPs) 900 within a signaling system number 7 (SS7) may be utilized.

Initially, a system IRDB including a selection of wireless carriers to be used was originally installed in a mobile device when purchased by a particular user. However, newer IRDB mechanisms allow for initial installation of a common IRDB when the mobile is initially activated over the air. Later updates of the common system IRDB can be performed whenever the mobile is powered up and available on the wireless network.

When any mobile device powers up, it scans for available wireless carriers, then compares available wireless carriers that it finds to the list of wireless carriers in its system IRDB. Based upon the match and priorities assigned to each matching wireless carrier, a wireless carrier is selected for service by the mobile device.

The common system IRDB includes wireless carrier codes for wireless carriers available to that mobile device as it roams throughout the entire country.

Wireless carrier codes are typically prioritized, e.g., into four main categories. For instance, a wireless carrier may be categorized as being HOME, PREFERRED, NEUTRAL or FORBIDDEN.

There may be only HOME wireless carrier (but not necessarily), a number of PREFERRED and NEUTRAL carriers, and even some FORBIDDEN wireless carriers.

PREFERRED wireless carriers may be, e.g., partners or secondary service providers in other regions and/or states who have agreed to favorable rates with the servicing wireless carrier.

NEUTRAL wireless carriers may include most wireless carriers throughout the country so as to provide the mobile device with a large area of coverage.

FORBIDDEN wireless carriers may relate, e.g., to non-preferred or out-of-plan wireless carriers whom the service provider for one reason or another will not allow its mobile devices to utilize. As another example, a wireless carrier may identify various wireless carriers as FORBIDDEN if a mobile device has a specific calling plan in a home market only, without no roaming authorized, and the wireless carrier doesn't want roaming charges. Thus, in this example, the system IRDB can be set up so that all other wireless carriers are FORBIDDEN for its mobile devices.

An IRDB has about a 166 byte maximum length, although a wireless carrier list of any length is within the scope of the present invention. Moreover, the current IRDB is limited to holding the codes for a maximum of about 82 wireless carriers, though a wireless carrier list having any plurality of wireless carriers is within the scope of the present invention. Moreover, the actual sizes of the wireless carrier list may vary from format to format. To provide the most complete use of roaming possible, a service provider will utilize large lists of roaming partner wireless carriers typically filling to capacity the system IRDB transmitted to all mobile devices.

FIG. 9 shows an exemplary geographical area serviced by a number of carriers over various geographical areas of the country.

In particular, as shown in FIG. 9, a first geographical region 1010 includes service provided by, e.g., two wireless carriers 1 and 2. A second geographical region 1020 includes service provided by three wireless carriers 1, 2 and 3. A third geographical region 1030 includes service provided by five wireless carriers 3, 4, 5, 6 and 7, and a fourth geographical region 1040 includes wireless service provided by a single wireless carrier 1.

For any given location of a mobile device, only a limited number of wireless carriers 1–7 are available for use by that mobile device within a region surrounding the mobile device. For instance, if a service provider for a particular mobile device is wireless carrier 1, service will be provided in the first, second and fourth geographical regions 1010, 1020 and 1040, while another wireless carrier must be used when the mobile device roams to the third geographical region 1030. The particular wireless carrier 3–7 utilized by the mobile device (including those wireless carriers not matching any entry in the system IRDB in the mobile device) relates to the priority assigned to wireless carriers 3–7 within the system IRDB maintained in the mobile device.

Thus, current IRDB update mechanisms send a common system IRDB containing information regarding all possible roaming partners to every mobile handset that is currently in the wireless network. This updating function, often requiring downloads to millions of mobile devices for any single update, can place a large burden on the network infrastructure of a wireless system.

Accordingly, there is a need for apparatus and methods for updating carrier information in a roaming mobile device which is less burdensome on a wireless network than conventional apparatus and methods.

SUMMARY OF THE INVENTION

In accordance with the principles of the present invention, a carrier list database manager for a mobile device comprises a plurality of different carrier lists. Each of the plurality of carrier lists is usable by a mobile device based upon a particular criteria. A carrier code list manager selects one of the plurality of different carrier lists for use by a particular mobile device.

A method of updating a carrier code list in a mobile device in accordance with another aspect of the present invention comprises determining if a mobile device containing a first carrier code list has roamed. If the mobile device has roamed, a second regional carrier code list different from the first carrier code list is downloaded to the mobile device.

A method of updating a carrier code list in a mobile device in accordance with yet another aspect of the present invention comprises determining if a mobile device containing a first carrier code list has changed location based on a registration notification message. If the mobile device has changed location, a second regional carrier code list different from the first carrier code list is downloaded to the mobile device.

BRIEF DESCRIPTION OF THE DRAWINGS

Features and advantages of the present invention will become apparent to those skilled in the art from the following description with reference to the drawings, in which:

FIG. 3A shows a mobile device initially being serviced by a preferred carrier in its home region. FIG. 3B shows the mobile device of FIG. 3A roaming to another region and utilizing an arbitrary carrier in the absence of carrier information for that new region. FIG. 3C shows the mobile device of FIGS. 3A and 3B re-registering and utilizing a preferred carrier in that new region.

DETAILED DESCRIPTION OF ILLUSTRATIVE EMBODIMENTS

Figure 1:
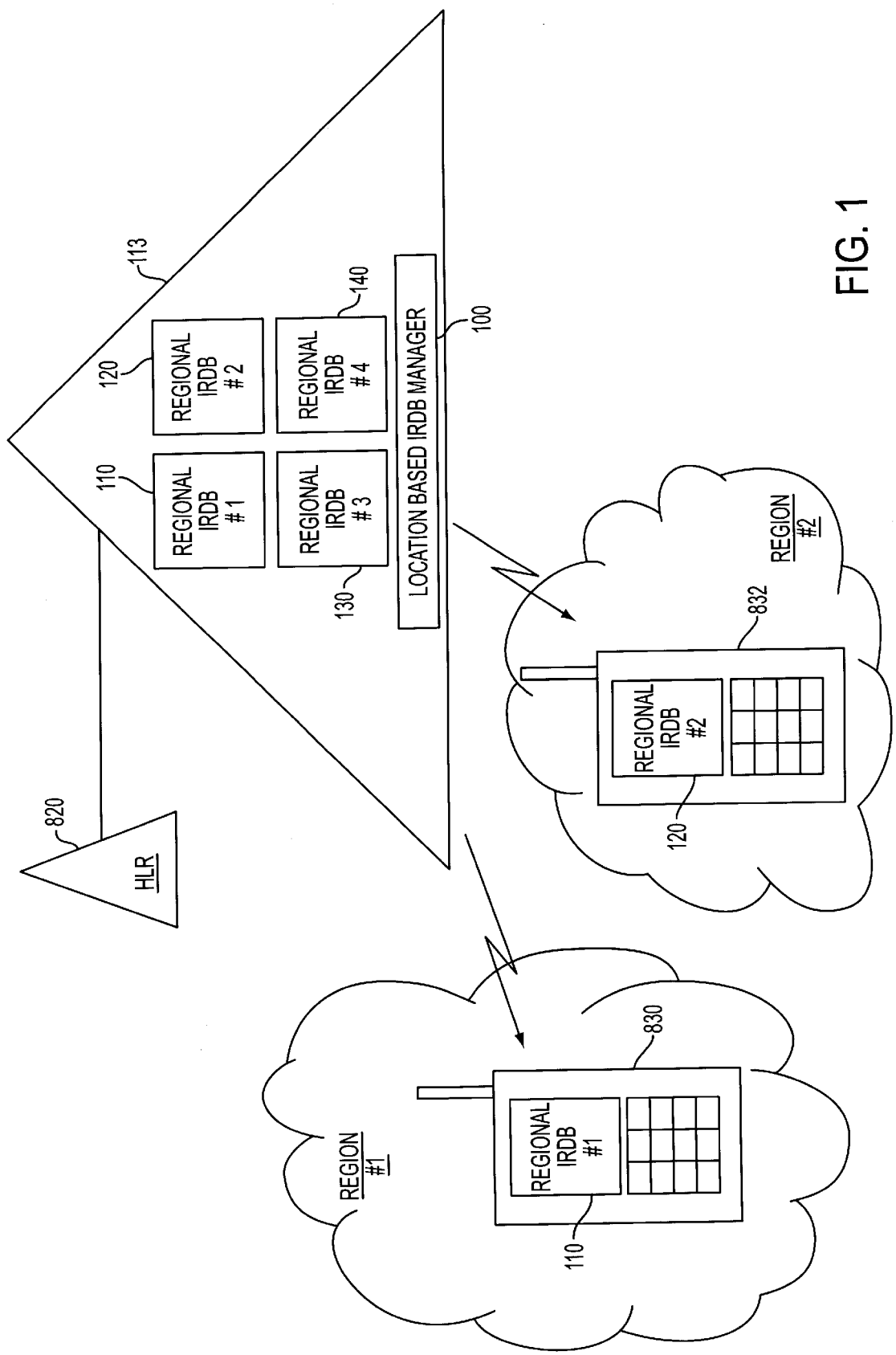
FIG. 1 shows an over the air function (OTAF) element including a location based Intelligent Roaming Database (IRDB) manager and a plurality of different IRDBs for use by individual mobile devices as they roam, in accordance with the principles of the present invention.

A unique method and apparatus to dynamically maintain different Intelligent Roaming Database (IRDB) or Preferred Roaming Lists (PRL) in a mobile handset. In accordance with the principles of the present invention, the current location of the mobile device or other individualized aspect of the mobile device is used to determine and select one of a plurality of different regional IRDBs for download to a particular mobile device.

The present invention provides methods and apparatus for using multiple, tailored wireless carrier lists (e.g., IRDBs, PRLs, etc.) for any particular service provider instead of a single system IRDB as in conventional systems. The wireless carrier lists in the disclosed embodiment are based on the location of a particular mobile device. For instance, a wireless carrier may want mobile devices when in a particular geographical region of the country to use a particular wireless carrier partner, and direct them into doing so by providing them with a location based IRDB for that particular geographical region. The same may be true for other geographical regions, but with other wireless carriers, and so other IRDBs may be created by the service provider and downloaded to a relevant subset of its serviced mobile devices when those mobile devices are detected as having roamed to that particular geographical region.

In accordance with the principles of the present invention, individual IRDBs may be developed for each mobile device, providing a customized wireless carrier list based on a type of subscription plan, etc. or other network or subscriber based feature. For the purposes of explanation, location based IRDBs will be shown and described.

For a particular location, only a limited number of wireless carriers will be available that the mobile handset will be able to utilize. The described IRDB is of the same size as the current system IRDB (i.e., 82 carriers maximum, 166 bytes maximum), although a list of wireless carriers of any length is within the scope of the present invention.

A location based IRDB is downloaded to a particular mobile device when the mobile device enters the location corresponding to that particular location based IRDB. When one of the many location based IRDBs are updated, only those mobiles in the relevant geographical region need have their IRDB updated. When the mobile device roams to a new geographical region and re-registers, a triggering event is formed.

The present invention brings the trigger for an IRDB update down to the level of the particular subscriber, e.g., based on the subscribers location, the subscribers plan, etc.

The triggering event may be detected by any suitable function of the wireless network, e.g., by utilizing a registration notification (REGNOT) message from the mobile device. The triggering event will cause the download to that triggering mobile device only from a suitable over the air function (OTAF) application including a suitable location based IRDB manager of the location based IRDB for that new region, whether the location based IRDB for that region has not been changed in a while or has been recently updated.

The described location based IRDB manager is implemented in Over The Air Programming (OTAP) software. The location based IRDB manager uses conventional registration information (e.g., the current location information contained in a REGNOT message) in conjunction with data contained in a database accessible to the location based IRDB manager to determine if a new and/or updated IRDB should be downloaded to the mobile device.

In the disclosed embodiment, a location based IRDB will be downloaded to a particular mobile device even if that mobile device had received the same location based IRDB during a previous roam but has since overwritten that IRDB with another IRDB as it roamed out of that area. However, the principles of the present invention relate equally to the retention of a plurality of location based IRDBs within a single mobile device so that a sort of cache of more than one location based IRDB is maintained within the mobile device.

Individualized IRDB updating reduces network loading in at least two ways. First, the amount of data that is contained in each individualized or location based IRDB can be shorter (and of course no larger) than a conventional system IRDB. This reduces the data bandwidth required to transport the necessary IRDBs to the mobile device. Secondly, when minor updates are made to any of the individualized or location based IRDBs that will only affect only those mobile devices in a certain geographical region, the updated individualized or location based IRDBs need only be sent to those mobile devices affected by the update. This reduces the conventional need to send an IRDB update to every mobile handset that is contained in a wireless network no matter where they are located whenever a change takes place anywhere in the wireless system.

Use of individualized or location based IRDB updates also allows for the implementation of incremental updates to the mobile devices using a particular location based IRDB quicker than if all mobile devices throughout the wireless service providers network would require an IRDB update as is conventionally performed.

Using a location based (i.e., regional) IRDB, mobile devices serviced by a particular service provider can be directed when requesting roaming service to preferred or neutral carriers when requesting roaming service, and/or directed away from forbidden carriers when roaming, based on the desires of the wireless company. In this way, a wireless carrier can optimize use of the wireless network and take advantage of more economical associations with certain carriers than with others.

Moreover, using a location and subscriber based IRDB, the available IRDBs can be focused on a subscriber differentiating feature, e.g., a class of service (COS) basis and/or on the current location of the mobile device, to provide further customization and direction of the mobile device to carriers desired by the servicing wireless company.

FIG. 1 shows an over the air function (OTAF) element including a location based Intelligent Roaming Database (IRDB) manager and a plurality of different IRDBs for use by individual mobile devices as they roam, in accordance with the principles of the present invention.

In particular, as shown in FIG. 1, a plurality of mobile devices 830–832 are serviced by a particular wireless service provider. The mobile devices 830–832 are associated with a particular home location register (HLR) 820 associated with the wireless service provider.

Importantly, in accordance with the principles of the present invention, the wireless service provider maintains a plurality of individualized or location based IRDBs 110–140 managed by a location based IRDB manager 100. While only four IRDBs 110–140 are shown in FIG. 1, the principles of the present invention relate to any plurality of IRDBs 110–140. As shown in FIG. 1, each of the IRDBs 110–140 contain differing lists of wireless carriers, although it is certainly possible or probable that in an actual application that a number of different IRDBs may actually contain similar or the same wireless carrier list. The present invention relates to the ability to accommodate different IRDB lists individualized to a particular mobile device's location, subscriber plan, etc.

The location based IRDB manager 100 and individualized IRDBs 110–140 implement an Over the Air Function (OTAF) conforming to a portion of the standards described in IS-725 and IS-725A, which relate to programming a mobile device over the air using Over the Air Programming (OTAP).

OTAP is conventionally used to activate a new mobile phone. Can activate service, phone number, etc. Originally, mobile devices were purchased with a given telephone number and service provider list pre-programmed. More recently, OTAP has allowed an assignment of a telephone number and programming of a service provider (i.e., wireless carrier) list when initially operating as a wireless mobile device. The present invention extends the use of OTAP to provide selective updates of the IRDB stored in any particular mobile based on a triggering event, e.g., based on a roam to a new location, based on selection of a particular subscription plan, based on a time of day, etc.

Figure 8:
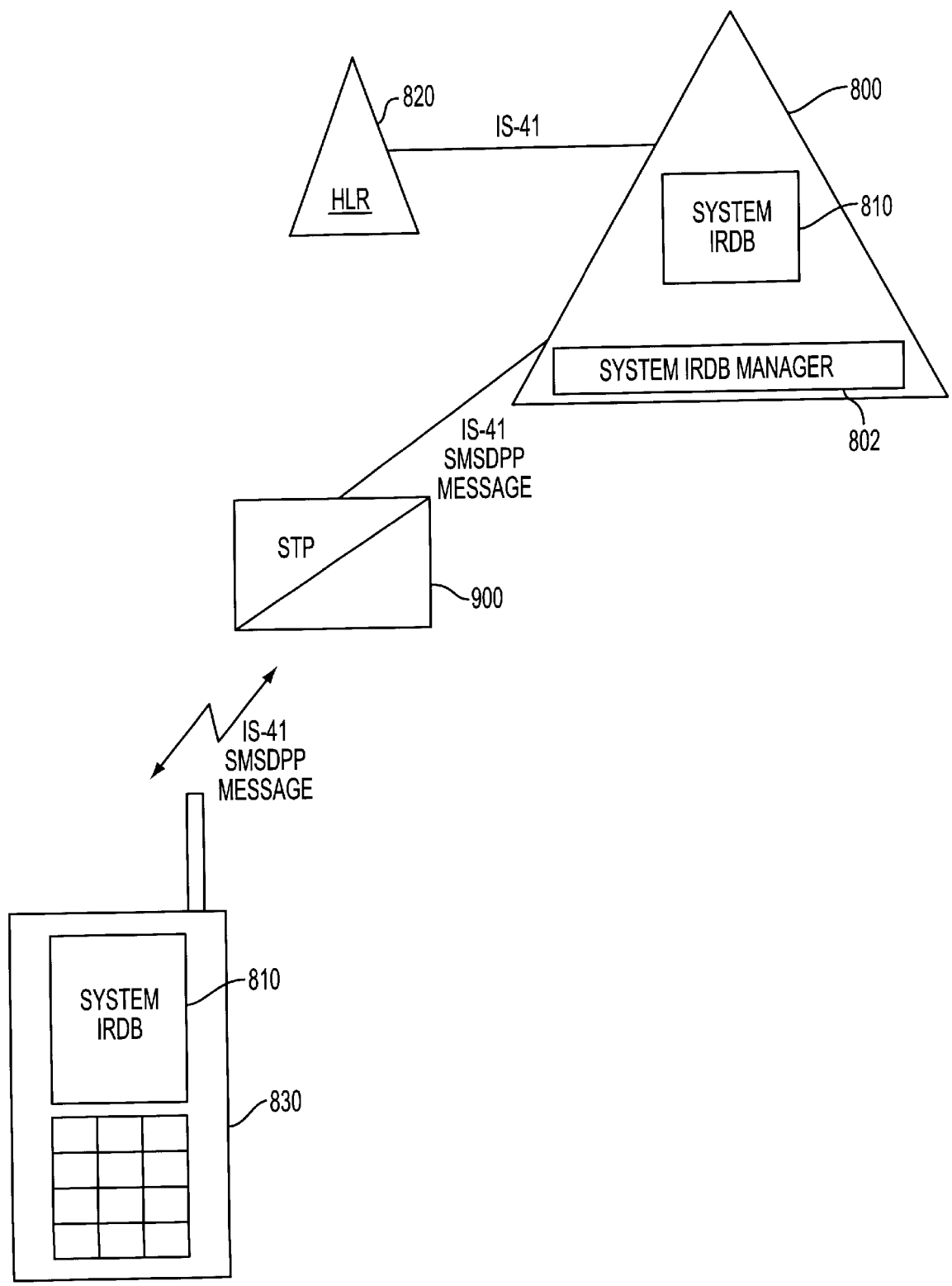
FIG. 8 shows the relevant conventional system elements shown in FIG. 7 in more detail.
Figure 9:
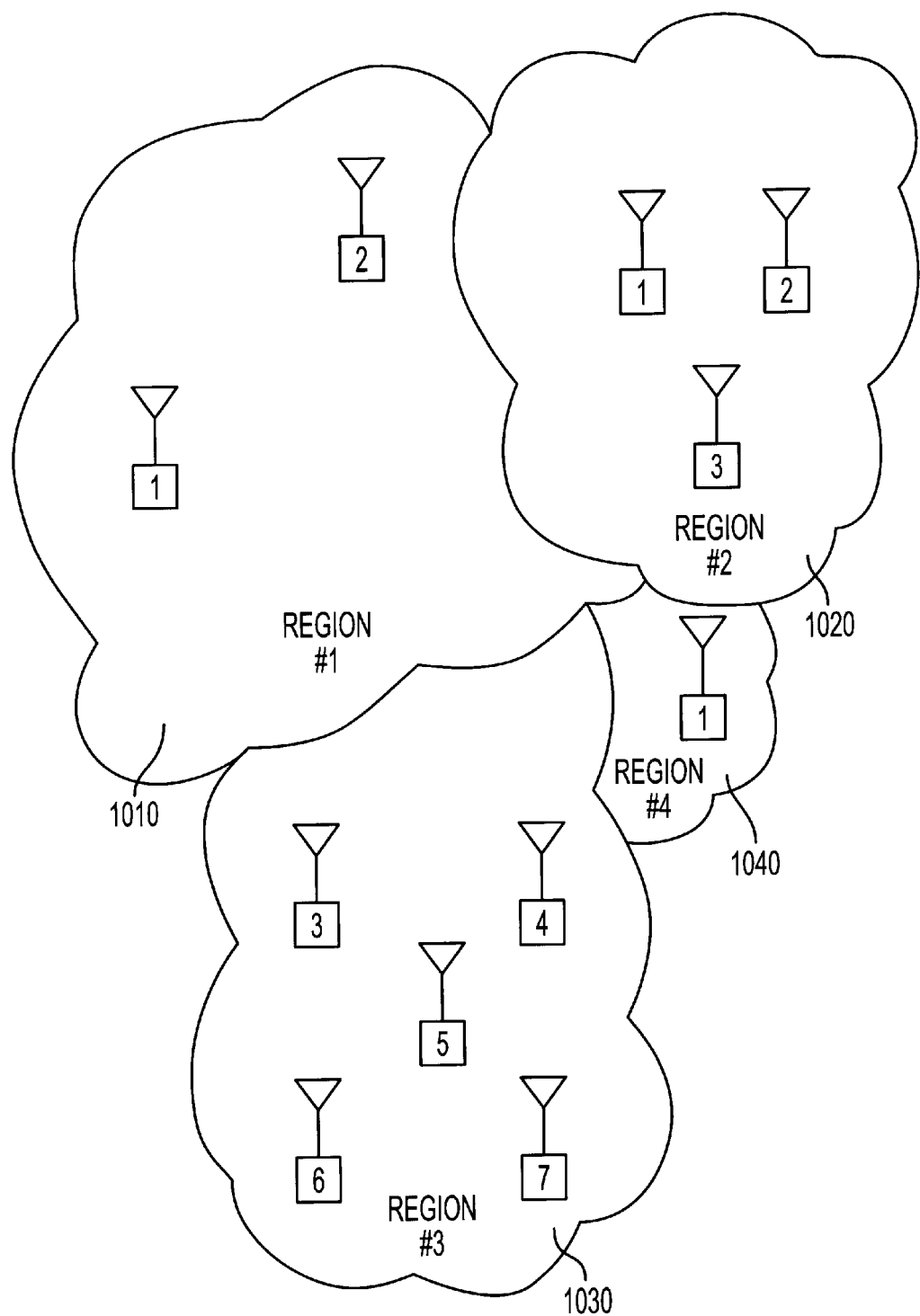
FIG. 9 shows an exemplary geographical area serviced by a number of carriers over various regions of the country.

The individualized or location based IRDBs 110–140 are of the same size as the conventional system IRDB 810 shown in FIG. 8, though it may be smaller. However, the individualized or location based IRDBs 110–140 are focused on current registration information of a particular mobile device (e.g., the region in which the mobile device is last registered in), and selected, e.g., based on movement or roaming to a new region, entry into a particular Class of Service, etc.

As shown in FIG. 1, a first mobile device 830 is registered for use in region #1, and thus contains a first regional IRDB 110. A second mobile device 832 is registered for use in region #2, and thus contains a second regional IRDB 120.

Regions can be defined as desired by the particular service provider implementing the present invention. For example, a region can be a geographical area defined by a city, a state, a county, etc. Alternatively, a region can be defined as an area covered by a particular wireless carrier, etc. In any event, in accordance with the principles of the present invention, an IRDB no longer relates to wireless carriers encountered by a wireless device wherever they may roam, e.g., over the entire country—only information (e.g., a wireless carrier list) relating to a particular one of many regions throughout the roaming area, e.g., throughout the country.

Conventionally, ah IRDB is about 162 bytes in length, and is global in nature such that all mobile devices serviced by a particular service provider, e.g., millions of mobile devices, are sent the same IRDB containing the same list of wireless carrier codes. In accordance with the principles of the present invention, a number of IRDBs can be defined relating to each of a plurality of regions. Moreover, the present invention even allows for the creation of millions of corresponding IRDBs each relating to a particular subscriber, and even each particular subscriber having their own regional IRDBs.

The IRDBs 110–140 may be customizable by the service provider and/or by the subscriber-themselves. For instance, a regional IRDB may be generated which relates to the regional wireless carrier in a roamed region that a service provider would prefer all of their mobile devices to hook up with when roaming to that region. However, perhaps a particular subscriber is not happy with the same wireless carrier that their wireless service provider prefers in a default IRDB for that roamed region. In such a case, provision may be implemented allowing the subscriber to 'customize' their own IRDB for that particular roamed region (or for more than just that roamed IRDB) based on or starting with the default IRDB by adjusting the default list of wireless carriers and/or their defined priority as contained in the default IRDB for that roamed region.

Thus, using regional (location based) or individualized (subscriber based) IRDBs, the IRDB list in any particular mobile device can become much more detailed as compared to a conventional system IRDB.

Because of the focus of an IRDB on the needs of a particular region, subscriber, etc., the present invention provides the capability to reduce the size of any IRDB stored in any mobile device. The size of an IRDB stored in a mobile device is limiting, while the ability to generate a plurality of IRDBs 110–140 stored on a suitable computer device is virtually endless, allowing as many as one IRDB for each service provider-defined region, or even as many as one or more for each subscriber serviced by the particular wireless service provider.

When a change in a wireless system occurs (e.g., the addition or deletion of a wireless carrier, the changing of a priority of a particular wireless carrier in any particular region, etc.), only those mobile devices registered in that affected region need be downloaded the new, updated IRDB for that particular region. No other mobile devices need receive that updated location based IRDB, reducing network traffic significantly because fewer IRDB updates need be transmitted by a wireless carrier upon many or most system changes.

Figure 2:
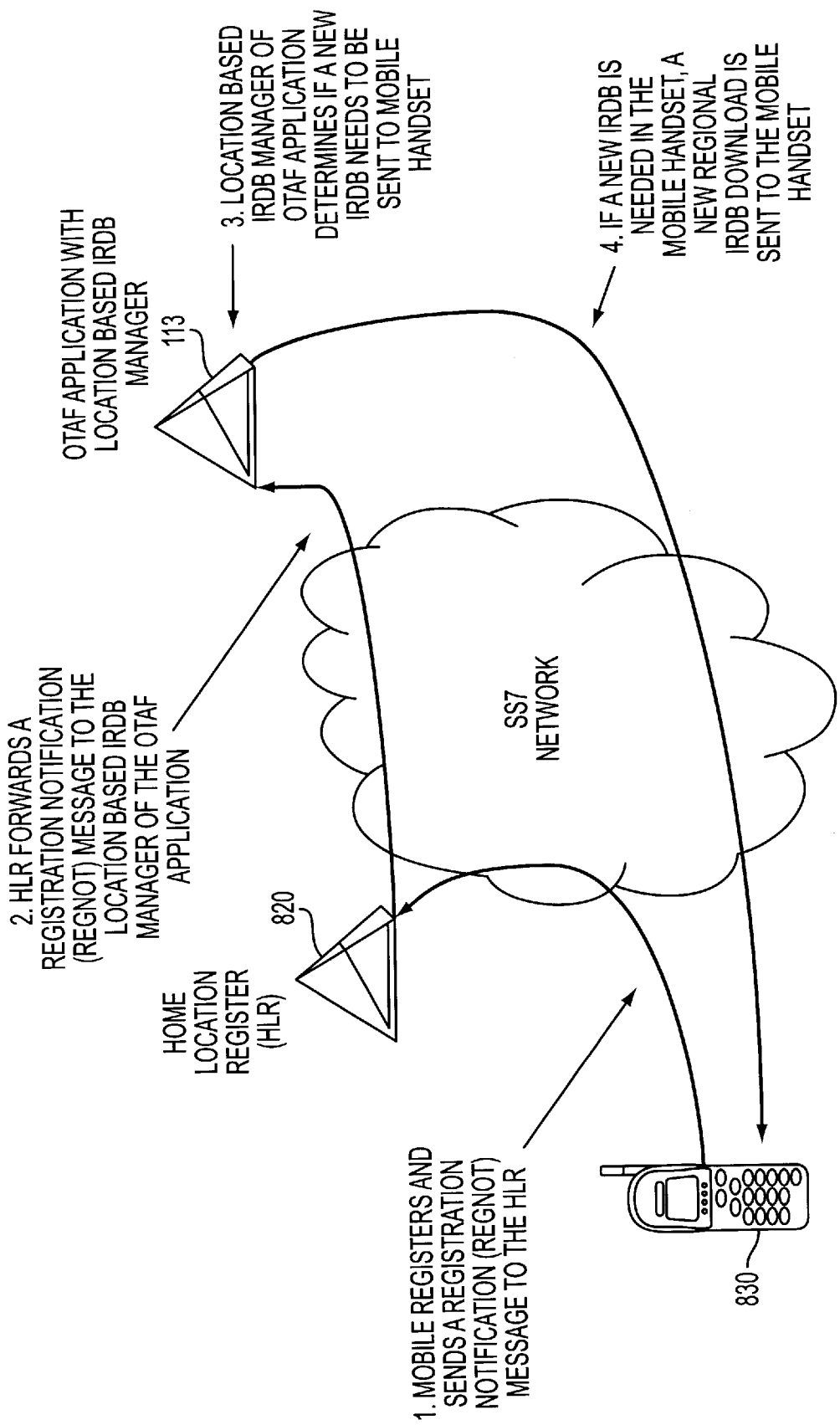
FIG. 2 shows an exemplary call flow description of updating an individual mobile device with one of a plurality of different IRDBs maintained by a location based IRDB manager, in accordance with the principles of the present invention.

FIG. 2 shows an exemplary call flow description of updating an individual mobile device with one of a plurality of different IRDBs maintained by a location based IRDB manager, in accordance with the principles of the present invention.

In particular, as shown in step 1 of FIG. 2, a mobile device 830 scans and registers with a serving wireless carrier using a conventional Registration Notification (REGNOT) message to its HLR 820.

In step 2, the HLR 820 forwards the IS-41 REGNOT message to the OTAF platform 113 that provides the location based IRDB updating mechanism. This is an exemplary method for the OTAF platform to obtain location information of the mobile. Other methods of location determination may be used. For instance, the apparatus and methods described in the co-owned U.S. application Ser. No. 09/576, 022 filed May 23, 2000 entitled "Mobile Activity Status Tracker" to Erik Wallace, W. Weichelbalmer, Daniel Hronek, Mark Titus and Dara Ung, may be implemented. U.S. application Ser. No. 09/576,022 is explicitly incorporated herein by reference.

In step 3, the OTAF platform 113 executes embedded logic to determine if the criteria is met to provide a new IRDB update to the registering mobile device 830 (e.g., if the mobile device has roamed, etc.)

In step 4, if such a suitable criteria has been met to provide a new location based or individualized IRDB to the mobile device 830, the new location based or individualized IRDB is downloaded directly to the mobile device 830 using an otherwise conventional text transport message, e.g., using an IS-41 SMSDPP command.

Figure 3A:
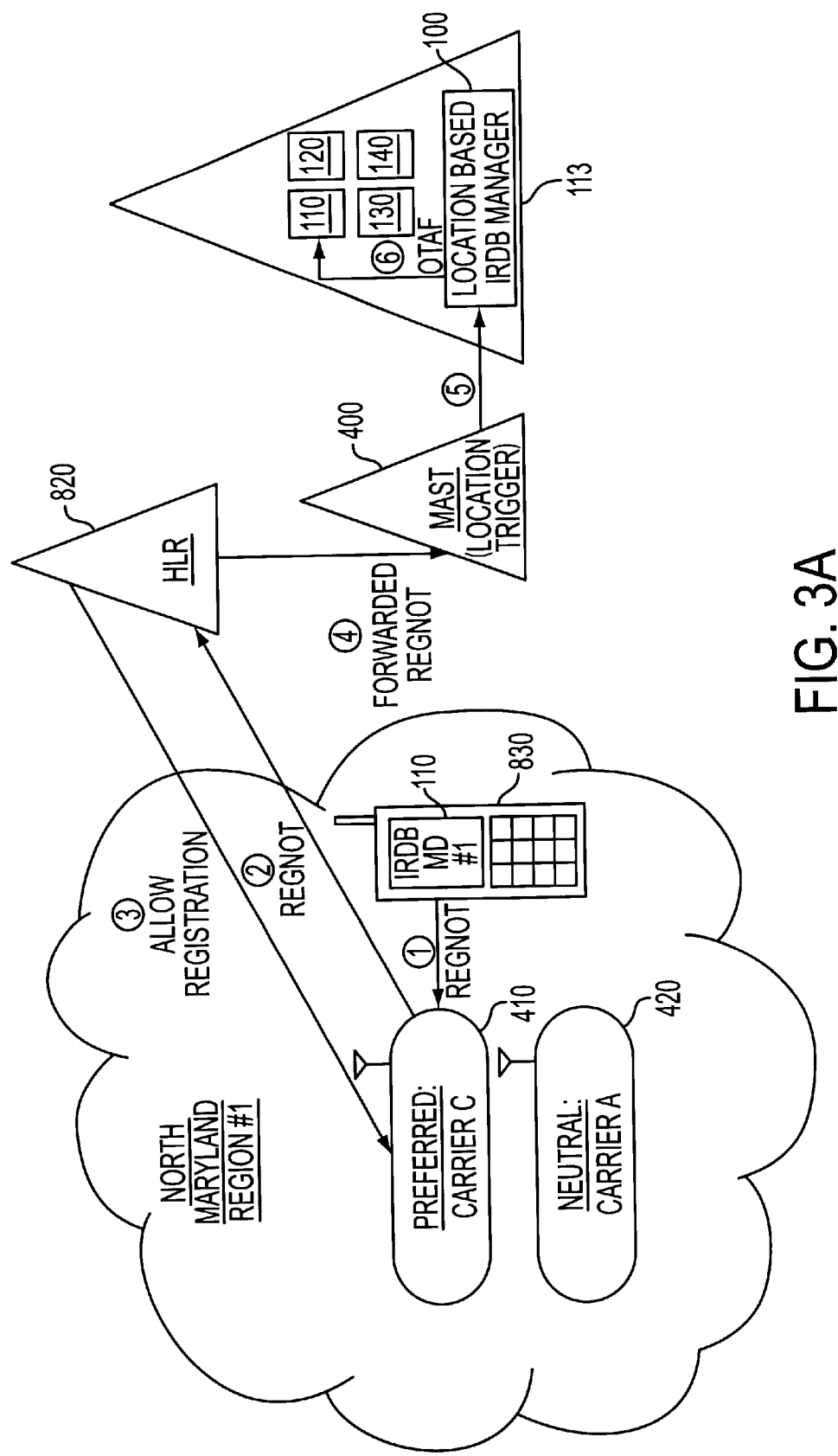
FIGS. 3A to 3C show exemplary message flows useful for an understanding of a process for allowing a mobile device to roam and be downloaded different IRDBs as it roams, in accordance with the principles of the present invention. In particular.
Figure 3B:
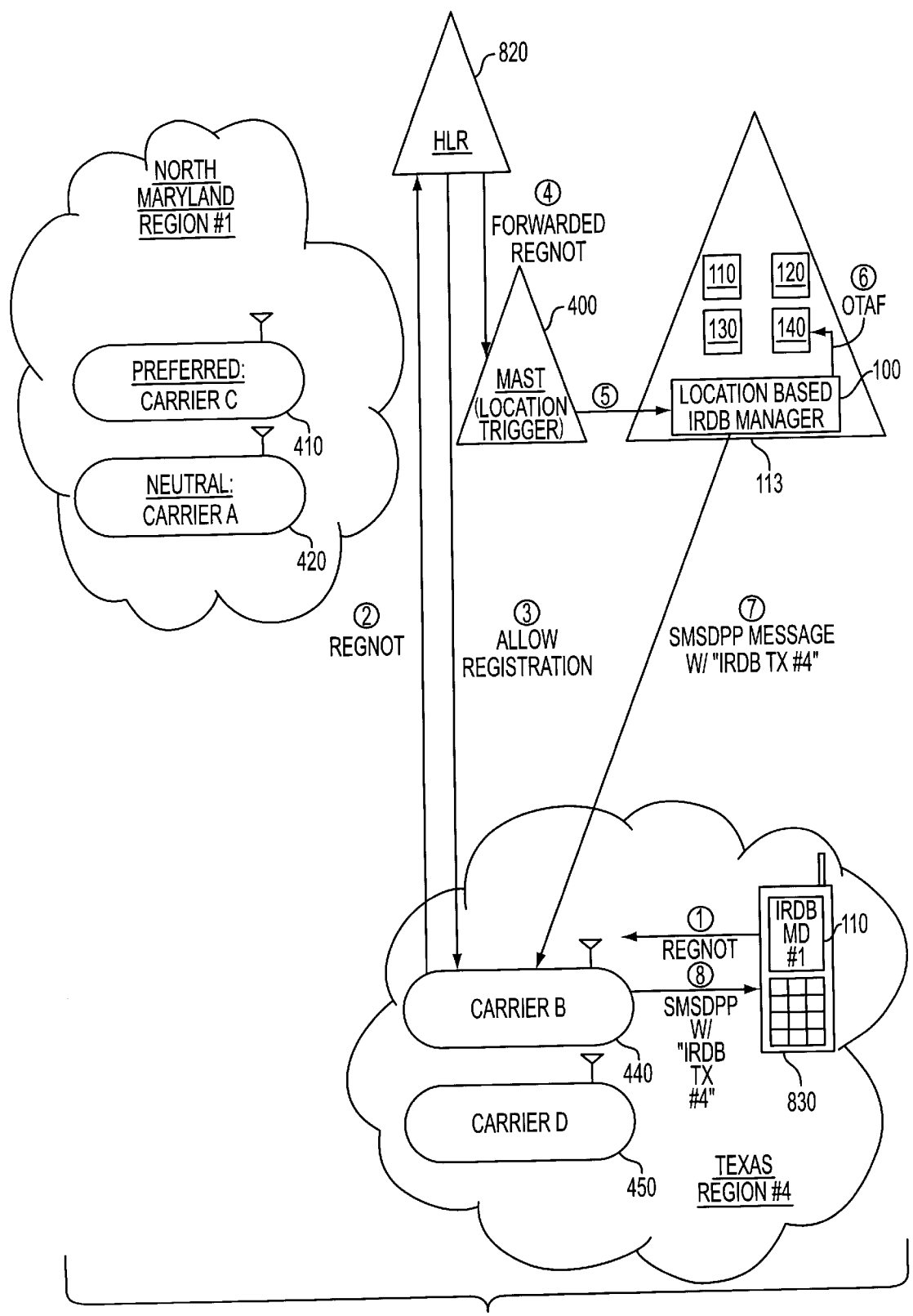
Figure 3C:
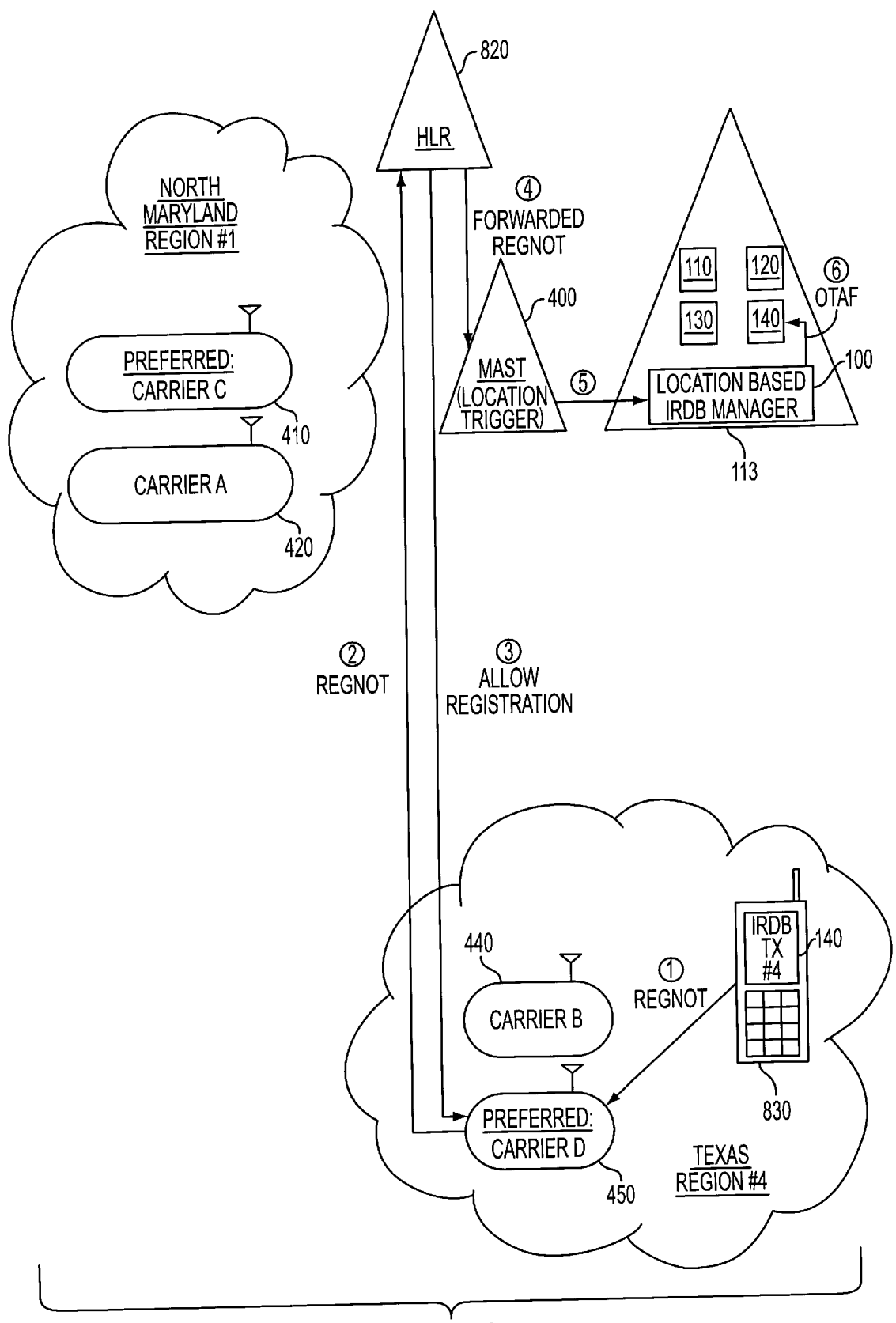

FIGS. 3A to 3C show exemplary message flows useful for an understanding of a process for allowing a mobile device to roam and be downloaded different IRDBs as it roams, in accordance with the principles of the present invention.

In particular, FIG. 3A shows a mobile device 830 initially being serviced by a preferred wireless carrier C 410 in its home region "North Maryland Region #1". The wireless carrier C 410 is designated as the "preferred" carrier within the North Maryland Region #1 by the service provider of the mobile device 830.

A particular HLR 820 of the mobile device's service provider is associated with the mobile device 830, as is a location triggering application, e.g., MAST 400. In accordance with the principles of the present invention, the service provider also provides a location based IRDB manager 100 on an appropriate OTAF platform 113. In the given example, the North Maryland Region #1 also includes another wireless carrier A 420, designated as "Neutral" by the service provider of the mobile device 830.

The wireless carriers 410, 420, the Home Location Register (HLR) 820, the MAST 400, and the location based IRDB manager 100 all communicate using conventional IS-41 messaging.

Message flow steps (1) to (5) shown in FIG. 3A relate to the message flows after the mobile device 830 initially powers on within its home region of North Maryland Region #1.

In step (1), the mobile device 830 transmits a standardized registration notification message (REGNOT) of IS-41 allowing the mobile device 830 to register with its HLR 820. The wireless carrier C 410 is currently assigned as the preferred carrier in the IRDB stored in the mobile device 830.

In step (2), the REGNOT message is forwarded by the servicing wireless carrier C 410 to the relevant HLR 820 associated with the mobile device 830.

In step (3), the mobile device's HLR 820 allows the registration of the mobile device 830, allowing the wireless carrier 830 to provide service to the mobile device 830.

Meanwhile, the HLR 820 also forwards the REGNOT message (4) to an IRDB triggering element, e.g., a location based triggering element such as a mobile activity status tracker (MAST) 400.

An exemplary mechanism to have the HLR 820 forward all of the registration notification and registration cancellation messages is a standards based function that is utilized. All or part of the information in this message can be used for selection criteria to determine the appropriate IRDB to send to the relevant mobile device 830.

In FIGS. 3A to 3C, a location-triggering application triggers a notification message shown in step (5) to the location based IRDB manager 100 based on activity of the mobile device 830, e.g., its roaming to a new region. As shown in FIG. 3A, no roaming has yet taken place by the mobile device 830.

A suitable location-triggering application is a mobile activity status tracker (MAST), as shown in FIGS. 3A–3C and 4. An exemplary MAST is shown and described in a co-pending and co-owned regular application U.S. application Ser. No. 09/576,022 filed on May 23, 2000, claiming priority from a provisional U.S. application Ser. No. 60/196,104 filed on Apr. 11, 2000, both of which are entitled "Mobile Activity Status Tracker" by Erik Wallace et al., and the entirety of both of which are expressly incorporated herein by reference.

Other triggers for activating a location based IRDB manager 100 to determine if a new or updated IRDB need be downloaded to a particular mobile device 830 are possible and within the scope of the present invention. For instance, a time-of-day based system may determine at a particular time each day whether or not a particular mobile device 830 requires a new or updated IRDB.

Location based IRDBs are described herein as exemplary only. For instance, the IRDBs may be distinguished in ways other than or in addition to location and/or COS of the subscriber. For instance, a particular mobile device 830 may be provided with different IRDBs based on the time of day. One particular IRDB may relate to prime time calling, while another IRDB for the same region may establish alternative carriers for the mobile device 830 to use during non-prime hours (e.g., at night or on weekends).

In any event, the MAST 400 is used in the shown embodiments to generate a trigger which causes the service provider's wireless network to automatically determine whether or not an update or new IRDB is required by a particular mobile device 830, and if so to perform such update as required.

Based on the information contained in the registration notification (REGNOT) message, an IRDB database in an OTAF platform 113 is queried by a location based IRDB manager 100 to determine if the last loaded IRDB 110 in the mobile device 830 remains valid, e.g., for the particular area that the mobile device has just registered in.

FIG. 3B shows the mobile device 830 of FIG. 3A roaming to another region and utilizing an arbitrary carrier in the absence of carrier information for that new region.

In particular, as shown in FIG. 3B, the mobile device 830 has now roamed completely into a new region, e.g., "Texas Region #4", and turned the mobile device 830 back on. Upon power up, the mobile device 830 re-scans to locate any available wireless carriers within range. In the given example, the mobile device 830 finds two wireless carriers B and D 440, 450, and compares those available carriers to the carrier codes stored in its current IRDB MD #1 110, and finds that neither of which have a code in the old IRDB 110 still stored in the mobile device 830 from when it was last used in the North Maryland Region #1.

At this point, the mobile device 830 may select any available wireless carrier based on any criteria, e.g., based on a scan order, strongest signal, etc. In the given example, the mobile device 830 has selected wireless carrier B 440 based on its scan order.

In step (1), the mobile device 830 registers with a REGNOT message. The selected wireless carrier B 440 sees that it doesn't know anything about the relevant mobile device 830, and attempts to find its HLR 820. The appropriate HLR 820 is conventionally determined based on, e.g., the mobile identification number (MIN).

Once determined, the wireless carrier B 440 forwards the REGNOT message in step (2) to the HLR 820.

In step (3), the HLR 820 allows the registration of the mobile device 830, but using wireless carrier B 440 for the time being.

In step (4), the HLR 820 forwards the REGNOT message to an appropriate IRDB triggering device, e.g., to the MAST 400.

In step (5), the MAST 400 forwards the triggering event (e.g., registration with location information) to the location based IRDB manager 100. Thus, mobile location information is sent to location based IRDB manager 100.

The communication between the HLR and the MAST, and between the MAST 400 and the location based IRDB manager 100 may take place using any suitable communication mechanism. Moreover, the triggering function (e.g., the MAST 400) and/or the OTAF platform 113 may each or both be integrated within another wireless network element, e.g., within the HLR 820. If separate, the HLR 820, the MAST 400, and/or the location based IRDB manager 100 may communicate using, e.g., TCP/IP protocol over the Internet, or any other suitable protocol. If the location based IRDB manager is integrated into the MAST 400, for example, proprietary communications may be used.

In step (6), the location based IRDB manager 100 determines whether or not a new IRDB is needed by the particular mobile device 830. In the given situation, a new IRDB is needed because the mobile device has roamed to a new region. Thus, the location based IRDB manager 100 retrieves the relevant IRDB 140 for the Texas Region #4.

As shown in step (7), the location based IRDB manager handles download of the retrieved IRDB 140 using, e.g., conventional text message transport mechanisms from the location based IRDB manager 100 directly to the mobile device 830, via the wireless carrier B 440 currently providing service to the mobile device 830. For instance, a SMS-DPP text transport message containing the 162 bytes (or other size) of the new IRDB 140 is generated from the location based IRDB manager 100 and sent to the mobile device 830.

Lastly, the mobile device 830 receives the new IRDB 140 relevant to the Texas Region #4 from the wireless carrier B 440, recognizes the content of the text message as a new IRDB, and accordingly reloads itself with the new Texas #4 IRDB 140.

Accordingly, the new IRDB is transmitted directly to a single mobile device 830 as the payload of a short message. A teleservice identifier tells the mobile device 830 that the contained IRDB information is an activation class message. The mobile device 830 sees that the content of the bearer message is an IRDB update, and proceeds to update its old MD #1 IRDB 110 with the new Tx #4 IRDB 140.

This is a confirmed process, with a valid acknowledgement sent back to the location based IRDB manager 100. Thus, if the contained IRDB file is corrupted, if the mobile device 830 is turned off midstream, or if another error-producing event occurs, the mobile device 830 will retain its old MD #1 IRDB 110 until it receives a retransmission of the new IRDB 140.

Accordingly, if delivery is not successful, the SMSDPP message containing the new TX #4 IRDB 140 will remain in a delivery queue 630 (shown in FIG. 5) in the location based IRDB manager 100 for a later retry, e.g., when the mobile device 830 powers up again, after a period of time, etc. Re-trys are handled by the SMS text delivery mechanisms. Thus, delivery of an updated IRDB is accomplished using conventional text based messaging.

As the mobile device 830 later determines, its wireless service provider really wants the mobile device 830 to be using the other wireless provider D 450 when in the Texas Region #4, e.g., because wireless carrier D is affiliated with the service provider of the mobile device 830 and wireless carrier B 440 is not, because wireless carrier B 440 costs more to the mobile device's service provider, etc. Up to this point, the message flow described with respect to FIG. 3B can all take place when the mobile device 830 is simply turned on, without any specific telephone call having been made.

FIG. 3C shows the function of the new IRDB 140 in the mobile device 830 of FIGS. 3A and 3B after it re-registers in the new region using the new Tx #4 IRDB 140 and utilizing the preferred carrier D 450 as defined in the relevant new Tx #4 IRDB 140 now stored and used in the mobile device 830.

In particular, as shown in FIG. 3C, the mobile device 830 will re-scan at its earliest convenience after having received and stored its new IRDB 140. At this point, the mobile device 830 will find its preferred wireless carrier D 450, and register with that carrier instead of with the wireless carrier B 440 which it registered with using a default selection criteria (e.g., scan order, strongest signal, etc.)

If the mobile device 830 happens to make a telephone call before fully receiving and implementing its new IRDB 140, then the prior wireless carrier B 440 will handle that telephone call, and the mobile device 830 may re-scan after completion of that telephone call (i.e., at its earliest convenience).

As shown in FIG. 3C, after the mobile device 830 registers with wireless carrier D 450, message flow steps (1) to (5) will happen, the location based IRDB manager 100 will see that the relevant mobile device 830 already has received an updated IRDB 140 for its new region, and the message flow process ends there (i.e., without message flow steps (7) and (8) as shown in FIG. 3B). Thus, at this point, no new IRDB is sent to the mobile device 830 (unless, of course, an administrative update occurred to the Tx #4 IRDB in the meantime, causing its own triggering event upon the registration of the relevant mobile device 830).

Figure 4:
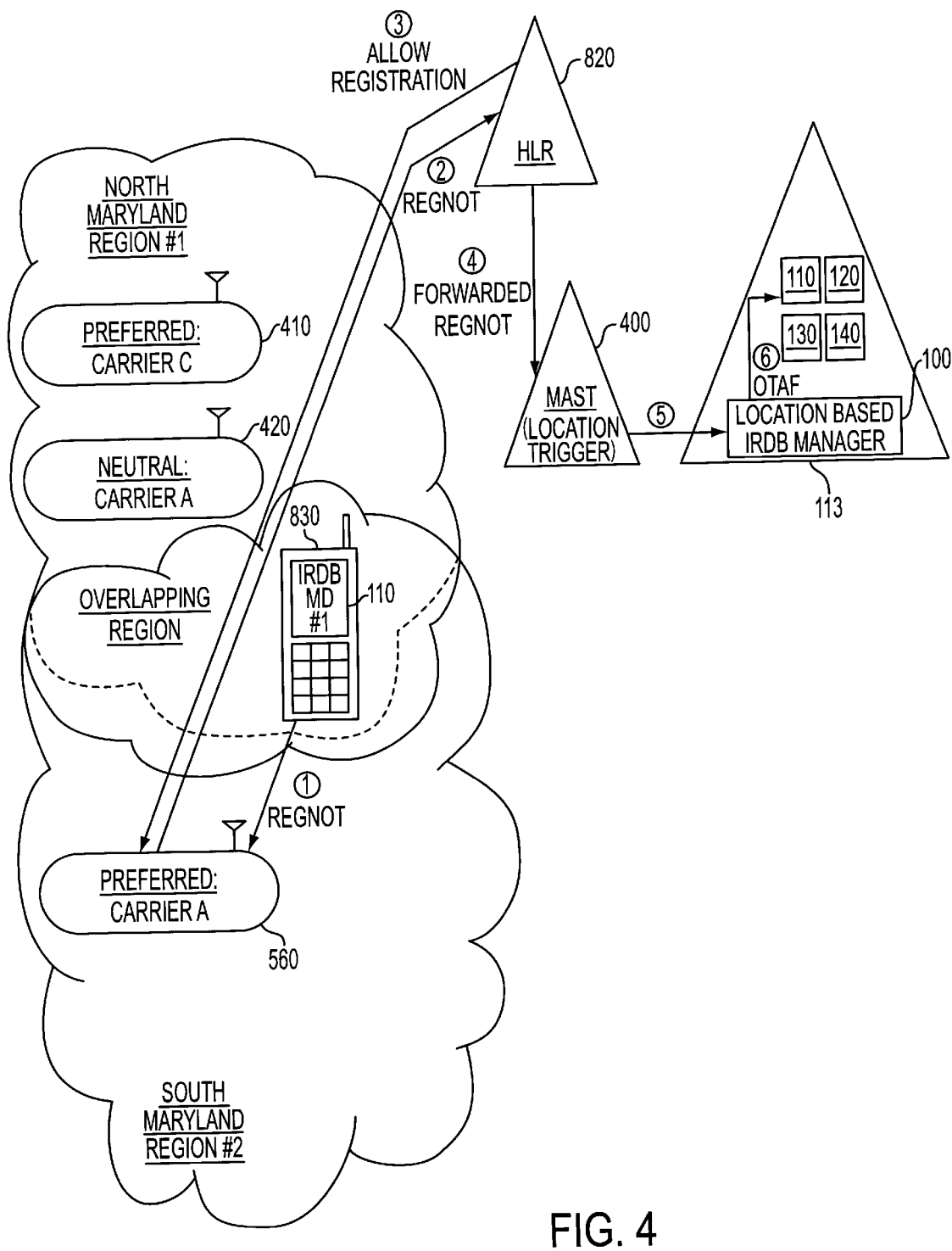
FIG. 4 shows implementation of carrier information for adjacent regions within an IRDB to provide a mobile device with carrier information when in a transitional region between the adjacent regions, in accordance with the principles of the present invention.

FIG. 4 shows implementation of carrier information for adjacent regions within a particular IRDB 110 to provide a mobile device 830 with carrier information when in a transitional region between adjacent regions, in accordance with the principles of the present invention.

In particular, FIG. 4 shows that the-regional IRDBs 110–140 may contain information regarding wireless carriers in outlying areas (e.g., in overlapping regions between distinct regions of service). Of course, the overlapping region may have its own IRDB associated therewith as defined by the particular service provider, in accordance with the principles of the present invention. Such an IRDB may include, e.g., relevant wireless carrier codes pertinent to a portion of the northern region and a portion of the southern region. Of course, a hard 'cut' or defined boundary between regions is within the principles of the present invention.

Using an overlapping region and separate IRDB associated therewith, a triggering event may be made to occur as the mobile device 830 moves into the overlapping region.

Figure 5:
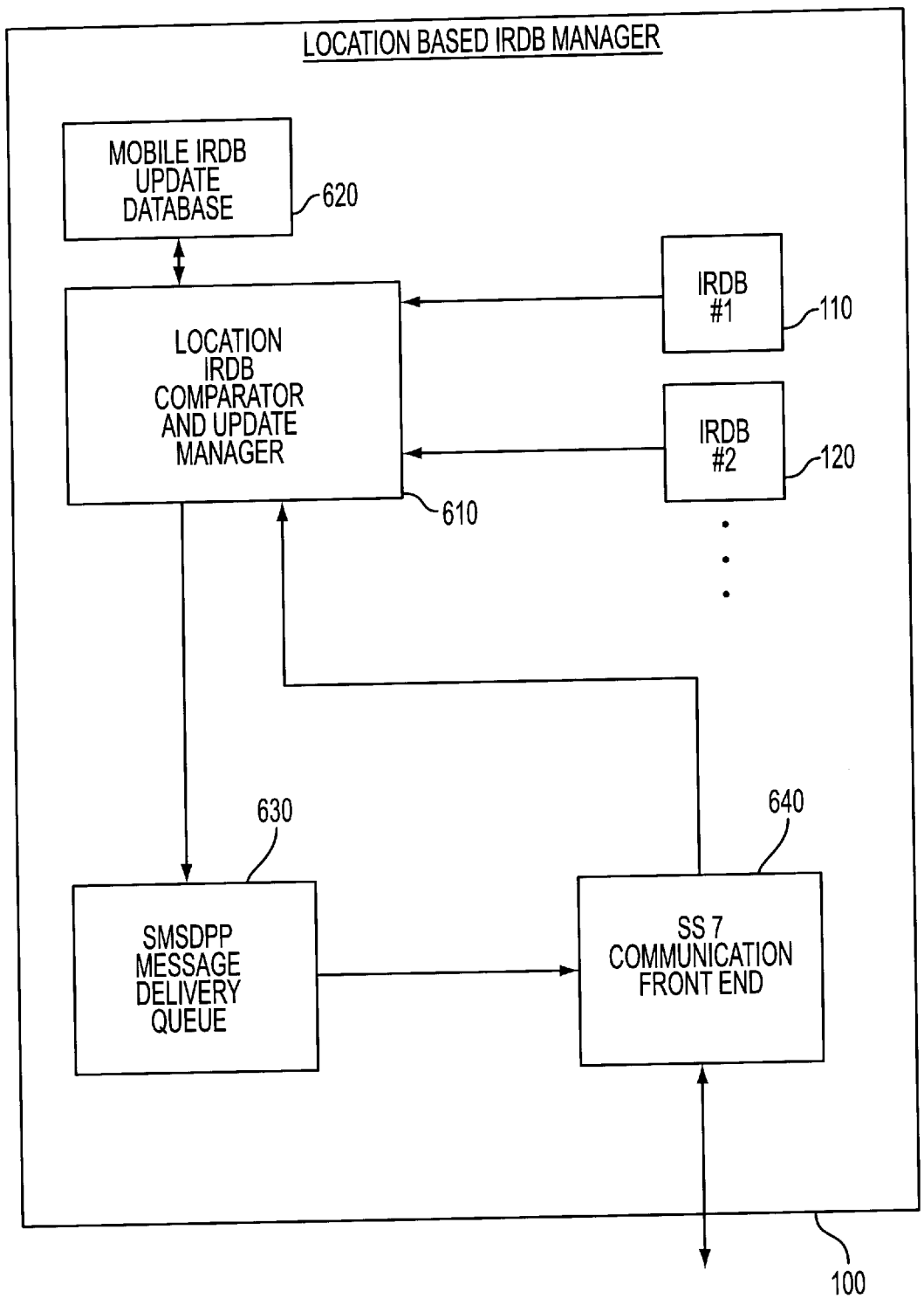
FIG. 5 shows functional elements of an exemplary IRDB manager (e.g., a location based IRDB manager), in accordance with the principles of the present invention.

FIG. 5 shows functional elements of an exemplary IRDB manager 100 (e.g., a location based IRDB manager), in accordance with the principles of the present invention.

In particular, the location based IRDB manager 100 may be an external OTAF platform running a suitable application program, or it may be integrated within another wireless network element, e.g., within the MAST 400 and/or HLR 820.

The disclosed location based IRDB manager 100 includes an appropriate SS7 communication front end 640 (e.g., IS-41) and SMSDPP message delivery queue 630 to handle communications with other network elements (e.g., with the HLR 820, with the MAST 400, and with the mobile device 830). The communication front end may be IS-41 or some other protocol that is compatible with communicating with the network elements. A location IRDB comparator and update manager 610 receives the generated trigger sent from, e.g., the MAST 400, and determines whether or not a new IRDB need be sent to the trigger causing mobile device 830.

In determining whether or not a new IRDB need be transmitted, the location IRDB comparator and update manager 610 may maintain an appropriate mobile IRDB update database containing entries for each serviced or supported mobile device 830. The location IRDB comparator and update manager 610 may compare information contained in its database 620 regarding the specific IRDB and/or its version last successfully transmitted to the trigger causing mobile device 830 to determine whether or not, and which IRDB need be downloaded to the mobile device 830.

The SMSDPP message delivery queue 630 and IS-41 communication front end 640 are otherwise conventional. For instance, if a message delivery attempt is unsuccessful, the unsuccessful SMSDPP message containing the IRDB update is requeued for a later attempted delivery to the relevant mobile device 830. The disclosed location based IRDB manager may use an external message delivery queue such as a short message service center, to provide the message delivery functions.

The mobile IRDB update database 620 may maintain information relating to the subscribers IRDB regarding, e.g., the last update time/date, the identity of the regional IRDB currently loaded in the mobile device 830, a description of the currently loaded IRDB, etc.

Figure 6:
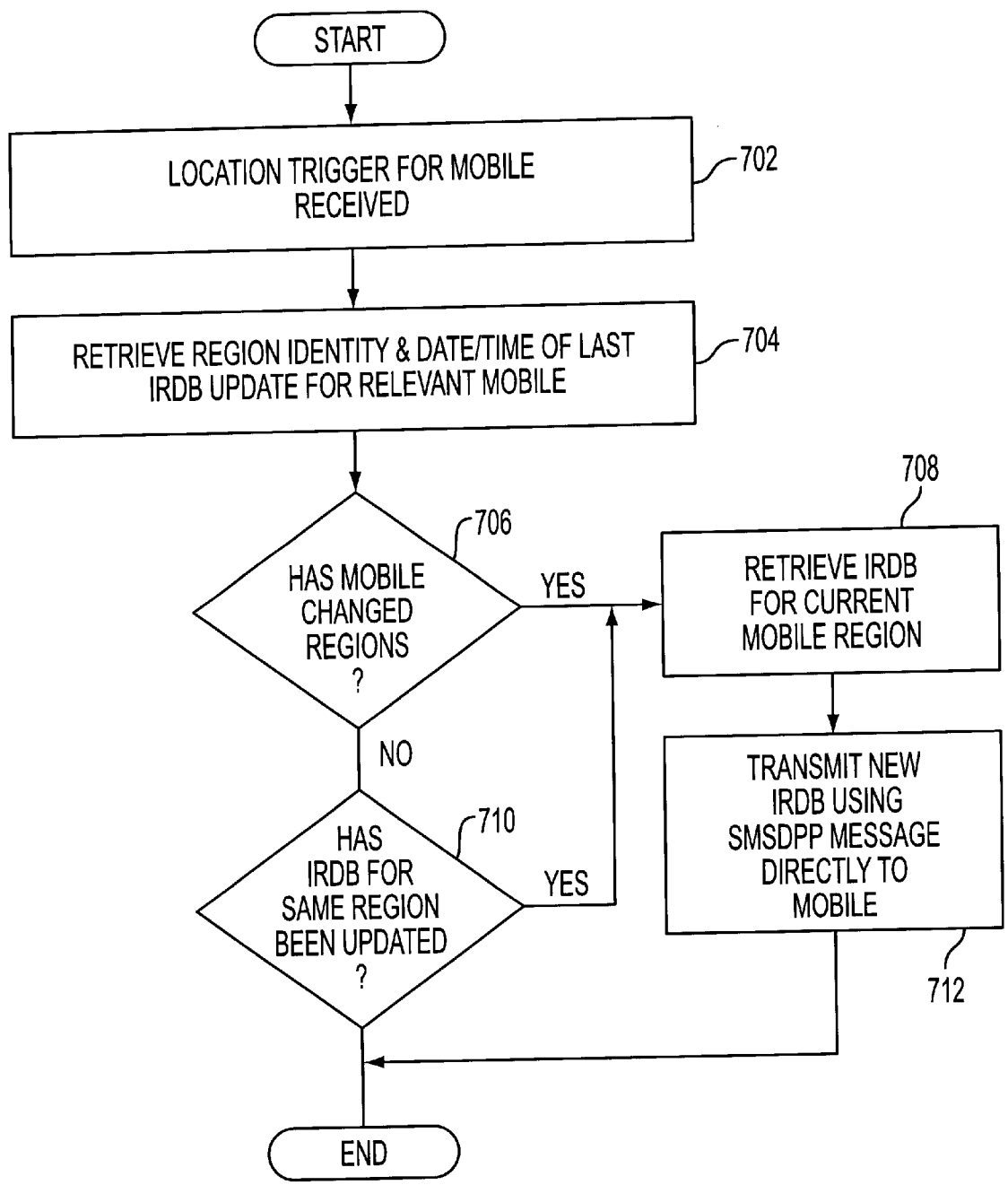
FIG. 6 shows an exemplary process flow of the location based IRDB manager shown in FIG. 5.
Figure 7:
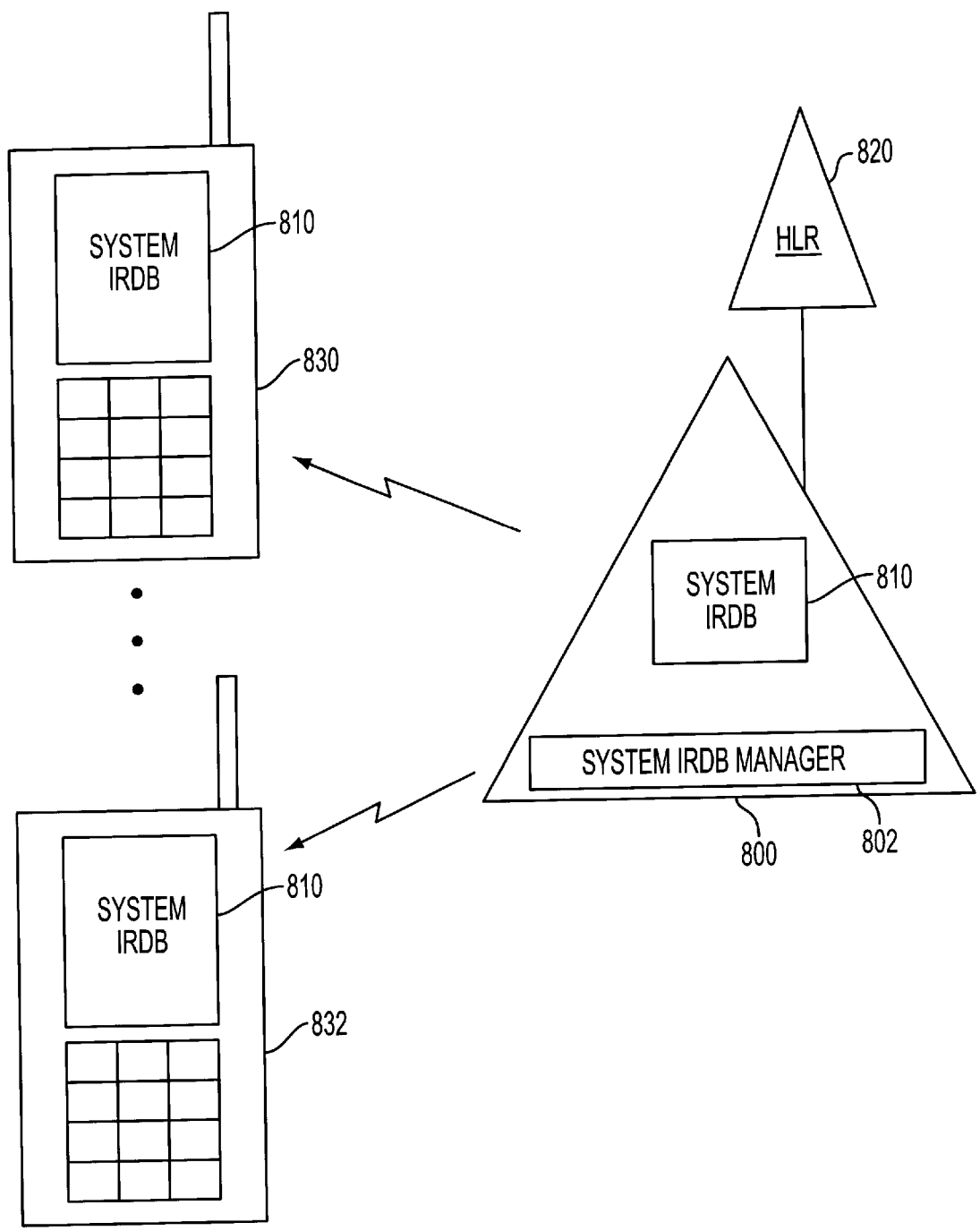
FIG. 7 shows relevant conventional system elements between a Home Location Register (HLR), a system Intelligent Roaming Database (IRDB), and a wireless network including a mobile device receiving updated copies of the system IRDB.

FIG. 6 shows an exemplary process flow of the location based IRDB manager shown in FIG. 6.

In particular, as shown in step 702 of FIG. 6, the location based IRDB manager 100 receives a location trigger relating to a particular mobile device 830.

In step 704, a specific version and identity of the last IRDB update downloaded to the triggering mobile device 830 is retrieved.

In step 706, the location based IRDB manager 100 determines whether or not the mobile device 830 has changed regions.

If so, then in step 708 the location based IRDB manager 100 retrieves the current IRDB relating to the currently registered location of the mobile device 830. Then, in step 712, the updated IRDB is downloaded to the mobile device 830 using, e.g., the text transport mechanism of the SMS-DPP message, and the process ends.

If the location based IRDB manager 100 determines that the mobile device 830 has not changed regions, then a secondary determination may be made as to whether or not the IRDB for the location already installed in the mobile device 830 has been updated administratively thus making a download desirable even if the mobile device 830 has not roamed. If so, a new IRDB update may be downloaded to the relevant mobile device 830 in steps 708 and 712.

Accordingly, an administrative update may cause a download of an updated IRDB to a mobile device 830 which has not roamed, but only to relevant mobile devices 830 registered within the changed region.

The present invention, while being described with respect to mobile devices such as a cellular telephone, the principles relate equally to other mobile devices, e.g., mobile data network devices.

Thus, in accordance with the principles of the present invention, not only can a vastly larger amount of IRDB information be provided to mobile devices in a wireless network by providing information relating specifically to a regional area (and perhaps to adjacent regional areas), additional subscriber services and features can be implemented by the wireless company (e.g., IRDB Class Of Service (COS)) by offering lower cost plans using only roaming partners with whom the wireless service has the most economical arrangements.

The present invention is described and shown with explicit or implicit reference to at least the following standards, each of which is explicitly incorporated herein by reference: IS-41D, IS-95A, IS-95B, IS-725A, IS-136A and IS-136B.

While the invention has been described with reference to the exemplary embodiments thereof, those skilled in the art will be able to make various modifications to the described embodiments of the invention without departing from the true spirit and scope of the invention.

What is claimed is:

1. A carrier list database manager for a mobile device, comprising:
    a plurality of different carrier lists, each of said plurality of carrier lists being usable by a mobile device based upon a particular criteria; and
    a carrier code list manager which selects one of said plurality of different carrier lists for updating a particular mobile device's carrier list when said particular mobile device changes circumstance requiring an update.

2. The carrier list database manager for a mobile device according to claim 1, wherein:
    said carrier code list manager downloads said selected one of said plurality of different carrier lists to said particular mobile device.

3. The carrier list database manager for a mobile device according to claim 1, wherein:
    said particular criteria is a location of said mobile device.

4. The carrier list database manager for a mobile device according to claim 1, wherein:
    said particular criteria is a class of service provided to said mobile device.

5. The carrier list database manager for a mobile device according to claim 1, wherein:
    each of said plurality of carrier lists relates to a unique region of coverage provided to said mobile device.

6. The carrier list database manager for a mobile device according to claim 5, wherein:
    each mobile device is associated with its own plurality of carrier lists relating to a unique region of coverage provided to said mobile device.

7. The carrier list database manager for a mobile device according to claim 1, wherein:
    each of said plurality of carrier lists relates to a unique mobile device.

8. The carrier list database manager for a mobile device according to claim 1, wherein:
    each of said plurality of carrier lists comprises a separate intelligent roaming database.

9. The carrier list database manager for a mobile device according to claim 1, wherein:
    each of said plurality of carrier lists comprises a priority roaming list.

10. The carrier list database manager for a mobile device according to claim 1, wherein:
    said carrier code list manager utilizes Over the Air Programming (OTAP) techniques to update a carrier list in a mobile device as it roams.

11. A method of updating a carrier code list in a mobile device, comprising:
    determining if a mobile device containing a first carrier code list has roamed; and
    if said mobile device has roamed, downloading a second regional carrier code list different from said first carrier code list to said mobile device.

12. The method of updating a carrier code list in a mobile device according to claim 11, wherein:
    said second regional carrier code list is downloaded to said mobile device using an SMSDPP message.

13. The method of updating a carrier code list in a mobile device according to claim 11, further comprising:
    establishing different carrier code lists for each of a plurality of different regions roamable by said mobile device.

14. The method of updating a carrier code list in a mobile device according to claim 11, further comprising:
    allowing a user of said mobile device to modify at least one IRDB downloadable to said mobile device.

15. A method of updating a carrier code list in a mobile device, comprising:
    determining if a mobile device containing a first carrier code list has changed location based on a registration notification message; and
    if said mobile device has changed location, downloading a second regional carrier code list different from said first carrier code list to said mobile device.

16. The method of updating a carrier code list in a mobile device according to claim 15, further comprising:
    retrying said downloading step if a first attempt at said downloading is unsuccessful.

17. Apparatus for updating a carrier code list in a mobile device, comprising:
- means for determining if a mobile device containing a first carrier code list has roamed; and
- means for downloading a second regional carrier code list different from said first carrier code list to said mobile device if said mobile device has roamed.

18. The apparatus for updating a carrier code list in a mobile device according to claim 17, wherein:
- said means for downloading downloads said second regional carrier code list to said mobile device using an SMSDPP message.

19. The apparatus for updating a carrier code list in a mobile device according to claim 17, further comprising:
- means for establishing different carrier code lists for each of a plurality of different regions roamable by said mobile device.

20. The apparatus for updating a carrier code list in a mobile device according to claim 17, further comprising:
- means for allowing a user of said mobile device to modify at least one IRDB downloadable to said mobile device.

21. Apparatus for updating a carrier code list in a mobile device, comprising:
- means for determining if a mobile device containing a first carrier code list has changed location based on a registration notification message; and
- means for downloading a second regional carrier code list different from said first carrier code list to said mobile device if said mobile device has changed location.

22. The apparatus for updating a carrier code list in a mobile device according to claim 21, further comprising:
- means for retrying said downloading step if a first attempt at said downloading is unsuccessful.

\* \* \* \* \*